United States Patent [19]

Baldwin

[11] 4,005,806

[45] Feb. 1, 1977

[54] APPARATUS FOR INJECTION OF HYGROSCOPIC POWDERS INTO A HIGH PRESSURE LIQUID STREAM

[75] Inventor: Bruce B. Baldwin, Grand Rapids, Mich.

[73] Assignee: Belknap Corporation, Grand Rapids, Mich.

[22] Filed: Nov. 3, 1975

[21] Appl. No.: 627,970

[52] U.S. Cl. .............................. 222/193; 222/318
[51] Int. Cl.² ........................................ B67D 5/54
[58] Field of Search ............... 222/193, 129.4, 161, 222/318; 169/5

[56] References Cited
UNITED STATES PATENTS 3,606,093 9/1971 Morse et al. ..................... 222/145

Primary Examiner—Stanley H. Tollberg
Assistant Examiner—Hadd Lane
Attorney, Agent, or Firm—McGarry & Waters

[57] ABSTRACT

An apparatus to inject fine hygroscopic powder into a high pressure stream has a dispenser which dispenses powder onto a flared dispersing surface mounted in a mixing receptacle. The flared dispersing surface disperses the powder and deposits the powder onto a collector portion of the mixing receptacle. A water supply means creates a film of water on the collector portion to mix the powder and water. An outlet on the bottom of the mixing receptacle is coupled to a high pressure stream through a venturi orifice to draw the mixture into a high pressure stream.

16 Claims, 4 Drawing Figures

APPARATUS FOR INJECTION OF HYGROSCOPIC POWDERS INTO A HIGH PRESSURE LIQUID STREAM

BACKGROUND OF THE INVENTION

1. Field of the Invention

This invention relates to an apparatus that mixes fine particles with flowing liquid to form either a slurry or a solution, and more particularly to an apparatus that injects fine powders into a high pressure liquid stream.

2. State of the Prior Art

Fine hygroscopic powders, when mixed with a liquid, tend to agglomerate before they are either completely mixed or dissolved. To avoid these agglomerations, the powder should be finely sprinkled onto the liquid and mixed thereafter.

Apparatus for dissolving hygroscopic powders into liquids are well known. One such apparatus is disclosed in the Burford U.S. Pat. 3,207,365. In the Burford apparatus, hygroscopic powder is fed from a hopper into a feed screw which advances the powder over an opening in the feed screw encasement thereby letting the powder freely fall. The dispensed powder falls into a conical dissolving chamber and is washed down by a spray of water is tangential to the conical dissolving chamber. The water-powder mixture passes through the vortex of the conical dissolving chamber and into an ejector. Another stream of liquid flows under pressure through a nozzle in the throat of the ejector to dissolve most of the hygroscopic powder. This solution is then piped into a working solution tank.

In the U.S. Pat. No. to Pfeuffer, 3,039,655, infusorial earth filter material or the like is charged into a liquid that flows in a pipe with variable pressure. The filter particles are dispersed by an air stream which is introduced tangentially into a bin. The filter particles flow through a valve and into a mixing chamber through which flows liquid to carry the filter particles in the main pipe. In another embodiment of the Pfeuffer device, in addition to the air stream, the liquid enters the bin in a spray form to mix with the earth particles falling therethrough. The spray can either come from a single nozzle or a pipe with many fine apertures surrounding the bin.

The motorized screw device used by Burford and the air flow device of Pfeuffer may be adequate for injecting small or moderate amounts of powder at a slow rate into a liquid but are inadequate for injecting extremely hygroscopic powders at a fast rate. The feed screw mechanism in the Burford device will not disperse the powder adequately to avoid agglomeration on the conical dissolving chamber. The Pfeuffer air chamber will not disperse hygroscopic powder at rapid rates without some agglomeration. These two devices and others are believed to be incapable of injecting substantial amounts of hygroscopic powders in a short period of time into a liquid without agglomeration.

SUMMARY OF THE INVENTION

According to the invention, an apparatus is provided for injecting a fine powder, such as a drag-reducing hygroscopic powder, into a high pressure stream of liquid, such as a stream in a fire hose to reduce the friction in the hose system.

A mixing receptacle receives both powder and liquid which are then mixed in the receptacle. A flared dispersing surface is mounted in the top portion of the mixing receptacle, onto which the powder is dispensed. The flare dispersing surface spreads outwardly and downwardly. Preferably, the flared surface is shaped as a cone or pyramid. A water supply means is located at an upper portion of the receptacle to provide a flowing film of water, preferably down an inclined side of the mixing receptacle located on the lower portion of the receptacle. The water supply means comprises horizontal pipes which are positioned just above the top edge of the inclined side wall of the mixing receptacle and which have a plurality of small downwardly facing openings to produce the film of water when water flows through the pipes and out through the openings. The flared dispersing surface has its bottom edge located vertically above the flowing water film to dispense the powder onto the water film as a fine sprinkle. An opening is located at the bottom of the mixing receptacle for withdrawing the mixture from the receptacle. A conduit which extends from the opening to a high pressure conduit injects the liquid mixture into a high pressure stream.

A shield is placed over the flared dispersing surface with enough separation between the two to allow the free flow of the powder on the flared surface. This shield is placed over the dispersing surface to reduce air turbulence which may exist in the mixing receptacle and to shield the dispersing surface from water which may splash in the mixing receptacle. The shield, by being placed over the flared dispersing surface, further helps direct the falling powder onto the flowing film of liquid.

A powder dispenser is placed at an upper portion of the mixing receptacle directly above the flared dispersing surface to dispense the powder onto the upper portion of the flared dispersing surface. Preferably, the powder dispenser is placed over a slotted aperture that is located in the top surface of the mixing receptacle. The slotted aperture is then covered by a valve, preferably a sliding valve made out of three plates, the top and the bottom plates thereof being fixed and the middle plate thereof being slidably mounted between the two fixed plates. The top and bottom plates have apertures which coincide with the aperture that is found on the top surface of the mixing receptacle. This valve controls the flow of powder that falls onto the dispersing surface in the mixing receptacle. Preferably, a vibrator is attached to the top plate of the slide valve. This vibrator promotes the powder to fall freely onto the dispersing surface without any clogging in the powder dispenser or any agglomeration of the hygroscopic powder.

Next to the vibrator and covering the sliding valve is a hopper to hold the powder before it enters the mixing receptacle. Mounted within the top portion of the hopper is a weight distributor that promotes the even flow of powder into the hopper. A powder supply container is connected to the top portion of the hopper so that the powder supply container opening is directly over the weight distributor. Between the container opening and the weight distributor lies a valve that controls the flow of powder out of the container.

A valve is preferably placed on a water intake conduit which connects to the horizontal pipes. With the two valves in the powder dispenser controlling the flow of powder and the valve on the intake conduit, the water and powder can be mixed in any proportion which allows the apparatus to be used in a variety of ways.

The advantage of this apparatus is that it allows a hygroscopic powder to be injected into a liquid at a relatively fast rate which allows hygroscopic powders to be used in a greater variety of ways. This apparatus can be used, for example, in fire fighting equipment with the powder being a friction reducing agent for the water. The powder mixes with the water and then is reintroduced into the high pressure stream on the intake side of the pump. The water is supplied to the mixing receptacle through the discharge side of the pump; hence, friction of the water is reduced not only in the hoses that are attached to the discharge side of the pump but also in the pump mechanism itself by reintroducing treated water on the intake side.

BRIEF DESCRIPTION OF THE DRAWINGS

The invention will now be described with reference the the accompanying drawings in which.

DETAILED DESCRIPTION OF THE PREFERRED EMBODIMENT

Figure 1:
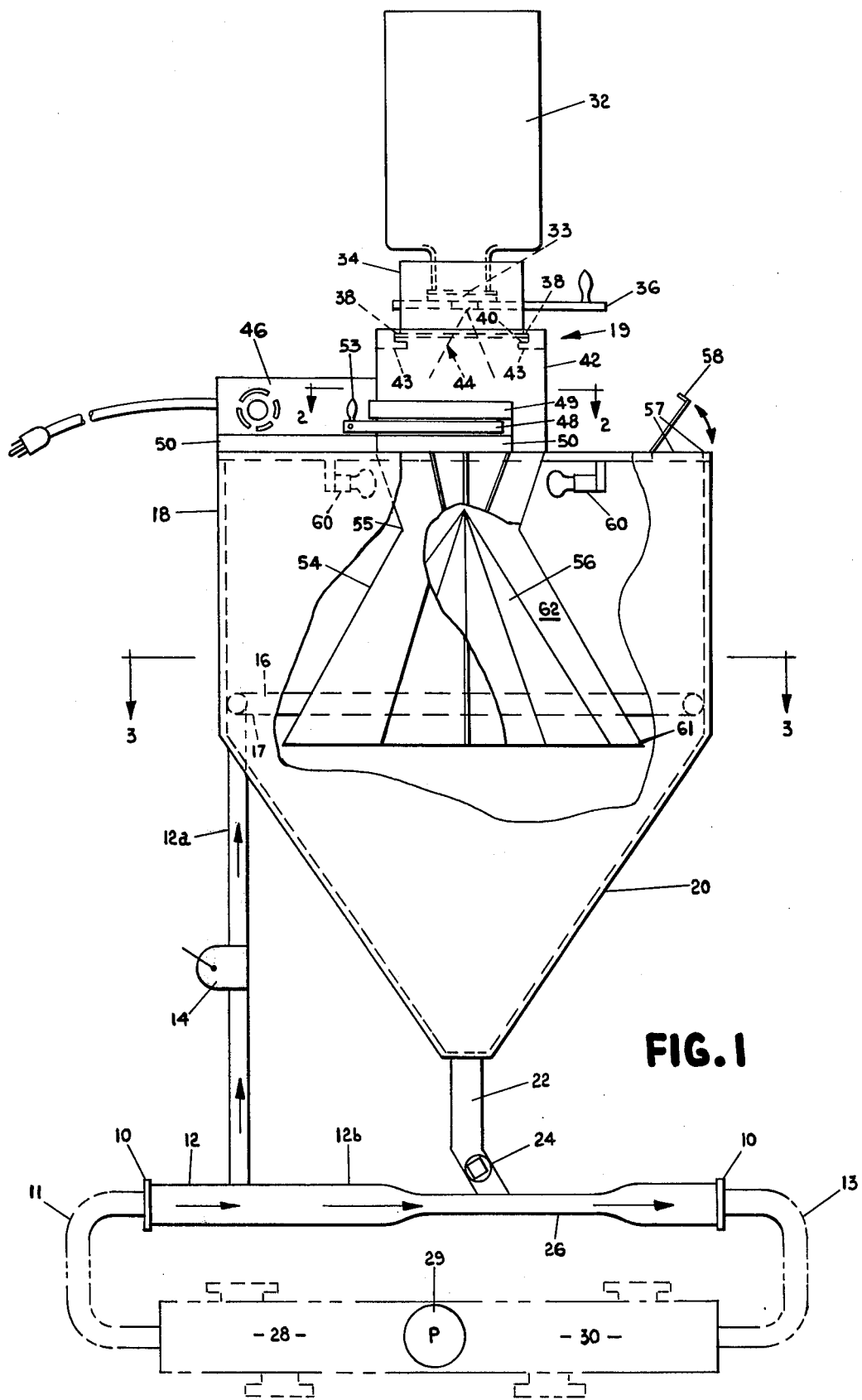
FIG. 1 is a schematic, and partially broken-away front view, showing a dispersing and mixing device according to the invention.

Referring now more particularly to the drawings, a water supply conduit 12 is equipped with an appropriate pipe adapter 10 to enable proper connection with high pressure hoses 11 which lead from the discharge side 28 of a pump 29. The water supply conduit 12 branches into two sections 12a and 12b. One branch 12a connects to a mixing receptacle 18 and is also equipped with a hand lever adjusting valve 14 to control the flow of water to the mixing receptacle 18. The water supply branch conduit 12a is connected to a dispensing conduit 16 positioned along the inside of the mixing receptacle 18. The dispensing conduit 16 distributes the water evenly as a film throughout all lower sides of the mixing receptacle 18. The second branch 12b is connected to a venturi pipe 26. The water dispensing conduit 16 is formed by a pipe which extends around all sides of the mixing receptacle. This pipe has a plurality of small apertures 17 which open downwardly for dispensing the water down the sides of the mixing receptacle. The water then flows down the funnel-shaped portion 20 of the mixing receptacle 18 into a discharge pipe 22 which is equipped with a check valve 24 that prevents any back-up of the water due to a drop in pressure. The water is drawn from the discharge pipe 22 into the venturi section 26 of water supply conduit 12b and out through appropriate hoses 13 into the intake side 30 of the attached pump 29. An appropriate adapter 10 is located at the end of the venturi pipe and is attached to the hose 13.

A powder supply dispenser 19 is positioned on top of the mixing receptacle 18 and mounts a powder supply container 32 which has an opening 33 on its bottom side. The powder supply container 32 is retained in an appropriate adapter 34 which has slidable adjusting gate valve 36 positioned therein. The gate valve 36 is capable of sliding movement to enable it to be open or closed with respect to the opening 33 of the powder supply container 32.

Figure 4:
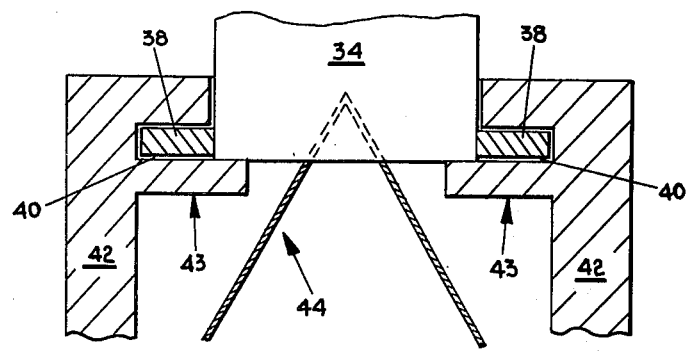
FIG. 4 is a fragmentary, broken-away, enlarged view of FIG. 1.

The adapter 34 rests on a ledge 43 of hopper 42. As shown clearly in FIG. 4, a set screw 38 is mounted close to the bottom surface of adapter 34 and projects outwardly thereof into a hollow 40 above the hopper ledge 43. The set screw thus retains the adapter in the hopper 42 against any upward forces. A notch (not shown) above the hollow 40 allows the release of the adapter when the adapter is rotated to align the set screw 30 with the notch.

Inside the hopper 42 a weight distributor 44 made preferably out of sheet material has two sloping sides with its apex located directly under the opening 33 of the powder supply container 32 and the gate valve 36. The weight distributor 44 is attached at the side edges thereof to the side of the hopper 42. The weight distributor 44 prevents the powder from flowing too quickly out of the container 32 and consequently minimizes clogging of the powder in the powder supply dispenser 19.

Figure 2:
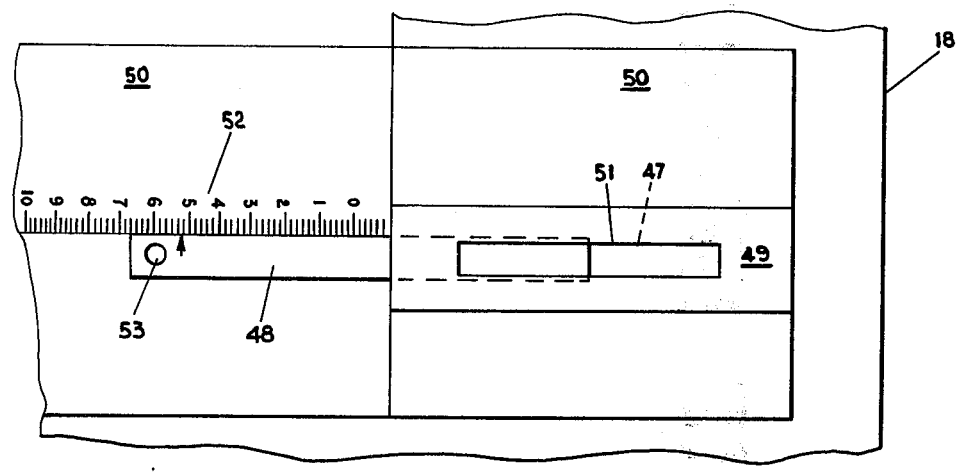
FIG. 2 is a cross-sectional view taken along lines 2—2 of FIG. 1.

Inside the hopper located on the top surface of the mixing receptacle 18 lie three horizontal plates 49, 48 and 50 which form a valve. The top and bottom plates 49 and 50 have apertures 51 which coincide with each other and also coincide with a slotted aperture 47 in the top surface of the mixing receptacle. The middle plate 48 has a width slightly greater than the slotted apertures 51 and a length greater than the slotted apertures 51. The middle plate 48 slides in a horizontal fashion to adjustably cover the apertures 51 so as to form a slide valve. As seen more clearly in FIG. 2, the aperture 51 of plate 49 is thinner and shorter than the width and length respectively of plate 48 to avoid clogging of the slide valve. A handle 53 is attached to the free end portion of the middle plate 48. An arbitrary scale 52 is located on the side of the middle plate 48. A pointer is marked on the plate 48 adjacent the scale 52 so that the opening of the plate 48 can be guaged.

An inertial vibrator 46 is mounted on the top plate 49 next to the hopper 42 in order to maintain a continuous flow of powder without any clogging or agglomeration of powder in the valve. When the vibrator 46 is turned on, a sufficient vibration is sent through the top part of the mixing receptacle 18 inside the hopper, through the weight distributor 44 and plates 49, 48 and 50 to prevent the clogging of powder in the valve plates 48–50. Such vibrations greatly decrease the possibility of the powder clogging or agglomerating.

A flat door 58 is hinged on one end of the top surface of the mixing receptacle 18 to enable a visual inspection of the mixing process in the mixing receptacle 18. An appropriate seal 57 lines the perimeter of the flap door aperture. This seal prevents any external air disturbances from entering the inside of the mixing receptacle 18 and also prevents any powder from escaping from the mixing receptacle when the door 58 is closed. To each any visual inspection that may occur when there is inadequate lighting, two small lights 60 are attached on the inside of the surface of the mixing receptacle 18.

Mounted within the mixing receptacle 18 and directly under the slotted aperture 47 is a flared dispersing surface 56 placed with its apex upward. The flared dispersing surface is preferably a pyramid with an octagonal cross-section with the bottom surface of the said pyramid extending below the water dispensing conduit 16. As used herein, the term pyramid is intended to mean a multiside sloping geometrical shape which converges to a point or apex. The pyramid is preferably hollow, made out of sheet material so that it is light weight and durable. The flared dispensing surface can also be shaped differently, such as a cone or hemisphere or other multisided pyramids. The dispersing surface 56 is supported by thin metal ties 59 connected to the bottom edge of the dispersing surface 56 whose other ends are attached to the bottom edge of a shield 54.

The inside surface of the bottom portion of shield 54 is the same shape as the outer surface of the flared dispersing surface 56 to form a uniformly spaced separation 62. The top portion of the shield 54 is flared outwardly and is mounted to the bottom side of the top surface of the mixing receptacle 18. The top portion of the shield is positioned to enclose the slotted aperture 47. The shield's throat 55 is of sufficient diameter to allow free passage of powder therethrough. The shield 54 and the dispersing surface 56 are separated sufficiently to allow free passage of the powder through the separation 62. The bottom edge of the shield 61 lies in the same plane as the bottom edge of the dispensing surface which is below the level of the water dispersing system 16.

Figure 3:
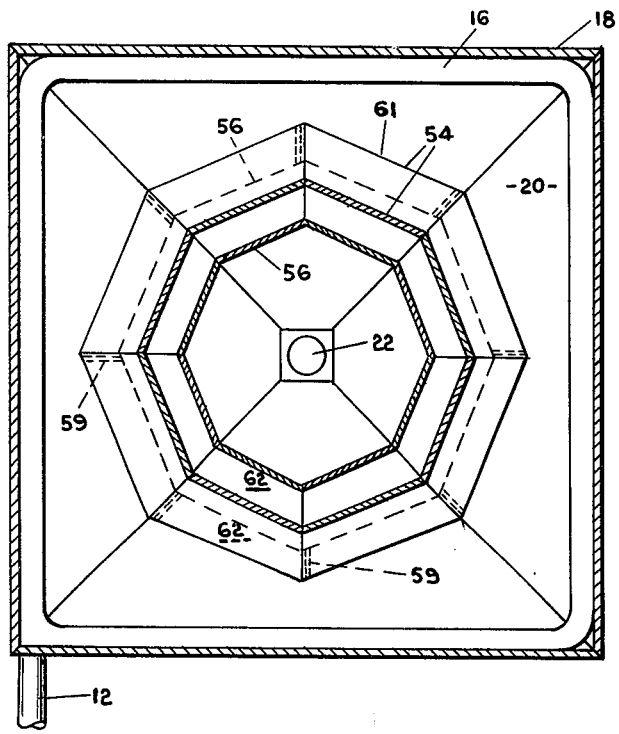
FIG. 3 is a cross-sectional view taken along lines 3—3 of FIG. 1.

In operation, the powder is dispensed from the powder container 32 through opening 33 and valve 36. The weight distributor 44 controls the powder flow into the hopper 42. The vibrator 46 keeps the powder from settling onto the walls of the hopper 42, valve plates 48-50 and other surfaces. The powder flows from the hopper through the valve of three horizontal plates 48-50. The powder enters the mixing receptacle as a sprinkle through aperture 47 and falls to meet the dispersing surface 56. The flared top portion of the shield 54 keeps the powder free of any unwanted disturbances as air turbulence or splashing water before the powder falls onto the dispersing surface 56. After falling on the top portion of the dispersing surface 56, the powder is separated or dispersed as it slides down the surface 56 protected from air turbulence and water by the bottom portion of the shield 54. As shown clearly in FIG. 3, the fine powder falls through the separation 62 and onto the funnel portion 20 of the mixing receptacle 18.

The water is supplied by intake conduits 12 and 12a with the rate of flow controlled by valve 14. The water is then evenly dispensed by the water dispensing conduit 16 through the plurality of small apertures 17. The water flows down the funnel-shaped portion 20 of the mixing receptacle 18 and is then mixed with the falling powder to form a slurry or solution. The discharge pipe 22 connected to the bottom of the funnel-shaped part 20 withdraws the slurry or solution from the mixing receptacle and injects the slurry of solution into the high pressure stream through the venturi pipe 26.

It should be understood that the foregoing embodiment of the present invention is merely illustrative of the preferred practice of the present invention and that various changes and modifications may be made in the arrangements and details of construction of the embodiments described herein without departing from the spirit and scope of the present invention.

The embodiments of the invention in which an exclusive property or privilege is claimed are defined as follows:

1. An apparatus for injecting fine hygroscopic powder into a flowing high pressure stream of liquid, said apparatus comprising:

a mixing receptacle having a collector surface near a bottom portion thereof and an outlet opening at the bottom of the receptacle;

a flared dispersing surface mounted within the receptacle above the outlet such that the surface spreads outwardly and downwardly and the powder dispensed from the dispersing surface falls on the collector portion of the mixing receptacle;

means for dispensing powder to an upper portion of the dispersing surface so that the powder is dispersed as it flows down the dispersing surface and onto the collector portion of the receptacle;

means for supplying a film of water to the collector portion of the mixing receptacle so that the powder is washed down by the film into the outlet opening of the receptacle; and means for passing the powder and liquid from the receptacle outlet to the high pressure water stream.

2. An apparatus defined in claim 1 wherein;
   the collector portion of the mixing receptacle is at least one inclined side wall terminating at the outlet opening of the bottom of the receptacle; and
   the flared dispersing surface bottom edge is vertically above a portion of the inclined side wall.

3. An apparatus defined in claim 1 wherein the flared dispersing surface is a pyramid shape with the apex of the pyramid vertically above the base.

4. An apparatus defined in claim 1 wherein the flared dispersing surface is conical in shape with its apex vertically above the base.

5. An apparatus defined in claim 1 further comprising:
   a shield placed over the flared dispersing surface with a separation between said shield and said dispersing surface to allow free passage of the powder down through the separation.

6. An apparatus defined in claim 1 wherein the means of dispensing powder comprises:
   an aperture on the top surface of the mixing receptacle for dispensing powder therethrough;
   a hopper mounted above the mixing receptacle and said aperture; and
   a powder supply container removably connected to the hopper and having an opening leading to the hopper for dispensing powder therethrough.

7. An apparatus as defined in claim 6 further comprising:
   a valve to control the flow of powder leaving the powder supply container;
   a weight distributor mounted in the hopper under the powder supply container opening to support the weight and control the flow of the powder into the hopper;
   a valve above the aperture on the mixing receptacle top surface to control the amount of powder entering the mixing receptacle.

8. An apparatus as defined in claim 7 wherein the valve above the slotted aperture comprises:
   three plates stacked one on the other, the outer two having apertures that coincide vertically with the slotted aperture on the top of the mixing receptacle, the middle plate being of solid material and having a width greater than the width of either aperture of the other plates, the outer two plates being attached rigidly to the mixing receptacle; and
   means slidably mounting the middle plate for horizontal movement over the apertures to adjust the opening through said two plates to allow them to be opened or closed by said middle plate.

9. An apparatus defined in claim 1 and further comprising a vibrator means operatively driving the means for dispensing powder to keep the powder flowing and to prevent clogging of the powder in the means for dispensing powder to an upper portion of the dispersing surface.

10. An apparatus defined in claim 2 whereby the means for supplying a film of water comprises:
   a pipe running horizontally above the top edge of the inclined wall;
   a means to supply liquid to the said pipe;
   a plurality of downwardly facing small apertures positioned in the bottom of said pipe to allow the liquid to flow downwardly on the inclined wall.

11. An apparatus defined in claim 2 further comprising:
   a shield placed over the flared dispersing surface with a separation between said shield and said dispersing surface to allow free passage of the powder down through the separation.

12. An apparatus defined in claim 11 whereby the means for supplying a film of water comprises:
   a pipe running horizontally above the top edge of the inclined wall;
   a means to supply liquid to the said pipe;
   a plurality of downwardly facing small apertures positioned in the bottom of said pipe to allow the liquid to flow downward on the inclined wall.

13. An apparatus defined in claim 12 wherein the bottom edges of the flared dispersing surface and the shield extend below the said means for supplying a film of water.

14. An apparatus as defined in claim 1 wherein the means for passing the powder and liquid from the receptacle outlet to the high pressure water stream includes: a conduit operably connected between the discharge side of the pump within the high pressure stream and the intake side of the pump so that a high pressure water stream flows from the discharge side to the intake side of the pump; a venturi section in the conduit, and the receptacle outlet operably connected to the verturi section so that the high pressure water stream draws the slurry therein and introduces the slurry to the intake side of the pump.

15. An apparatus as defined in claim 14 wherein a hose is operably connected to the discharge side of the pump to allow the slurry and water to egress through the hose.

16. An apparatus for injecting a fine hygroscopic powder into a flowing high pressure stream of liquid, said apparatus comprising:
   a mixing portion;
   means for supplying water to the mixing portion;
   means for dispensing and dissolving a powder into the water within the mixing portion to form a slurry;
   a pump means within the high pressure stream for creating and maintaining the high pressure within the high pressure stream;
   a conduit of the high pressure water stream operably connected to the intake and discharge sides of the pump means so the high pressure water stream flows from the discharge side to the intake side of the pump means;
   means for introducing the slurry to a conduit of the high pressure water stream;
   a hose operably connected to the discharge side of the pump means to allow the water and slurry to egress through the hose.

* * * * *